United States Patent [19]

Mauer

[11] Patent Number: 4,781,500
[45] Date of Patent: Nov. 1, 1988

[54] METAL BLIND RIVET
[75] Inventor: Dieter Mauer, Lollar, Fed. Rep. of Germany
[73] Assignee: Emhart Enterprises, Corp., Farmington, Conn.
[21] Appl. No.: 38,092
[22] Filed: Apr. 14, 1987
[30] Foreign Application Priority Data
  Apr. 14, 1986 [DE] Fed. Rep. of Germany ....... 3612478
[51] Int. Cl.⁴ .............................................. F16B 13/06
[52] U.S. Cl. ...................................... 411/36; 411/37; 411/43
[58] Field of Search ........................ 411/36, 41, 43, 34, 411/35, 37, 38

[56] References Cited
U.S. PATENT DOCUMENTS

| | | | |
|---|---|---|---|
| 2,030,166 | 2/1936 | Huck | 411/34 X |
| 3,735,665 | 5/1973 | Mortensen | 411/36 |
| 3,866,998 | 2/1975 | Iantorno | 411/43 |
| 4,236,429 | 12/1980 | Dolch | 411/41 |
| 4,436,467 | 3/1984 | Larsson et al. | 411/34 |

FOREIGN PATENT DOCUMENTS

| | | | |
|---|---|---|---|
| 077852 | 5/1983 | European Pat. Off. | 411/38 |
| 2257002 | 9/1973 | Fed. Rep. of Germany | 411/36 |
| 2525275 | 1/1976 | Fed. Rep. of Germany | 411/37 |
| 1533353 | 6/1968 | France | 411/36 |
| 598730 | 2/1948 | United Kingdom | 411/36 |

Primary Examiner—Gary L. Smith
Assistant Examiner—Curtis B. Brueske
Attorney, Agent, or Firm—Thomas S. Szatkowski

[57] ABSTRACT

A metal blind rivet assembly having a plurality of ribs with flutes between them located about the circumference of the barrel of the rivet sleeve. The ribs are arranged in a helix and at an angle so that during the setting operation a twisting motion takes place to scrape the workpiece so that contaminants such as dirt or varnish are removed to provide electrical contact with the workpiece.

8 Claims, 3 Drawing Sheets

METAL BLIND RIVET

BACKGROUND OF THE INVENTION

The present invention relates to metal blind rivets for riveting one or more structural members, consisting of a rivet sleeve having a tubular barrel and flange and a mandrel, penetrating the rivet sleeve, having a break neck and setting head, which together with a substantial portion of the stem, projects before the setting operation over the surface of the structural member as the deformation piece for forming a counter head, and in which the barrel is provided with longitudinally-extending flutes distributed round the circumference, and extending over a substantial length of the deformation section.

A blind rivet of this kind is known from German DE-Gbm No. 84 06 284.3. The grooves are provided on this blind rivet in order to ensure that the shank is split up into a number of ribs extending in longitudinal direction, which are splayed outwardly during the setting operation and ultimately double up, i.e. project outwardly as a compressed U-shaped rib and thus form a radially-extended, radially-formed counter head. However, because of the splitting up of the shank into several ribs separated from one another, the compactness of the counter head is considerably decreased since the radially outwardlyextending ribs are no longer in contact with each other in their outer region.

The object of the invention is therefore, with reference to the metal blind rivet above-mentioned, to improve the latter so that the compactness of the counter head is substantially increased, which is what matters decisively when considering metal blind rivets.

BRIEF DESCRIPTION OF THE INVENTION

According to the present invention, we provide a metal blind rivet for riveting one or more structural members, consisting of a rivet sleeve having a tubular barrel and flange and a mandrel, penetrating the rivet sleeve, having a break neck and setting head, which together with a substantial portion of the stem, projects before the setting operation over the surface of the structural member as the deformation piece for forming the counter head, and in which the barrel is provided with longitudinally-extending flutes distributed round the circumference, and extending over a substantial length of the deformation section, wherein the flutes are arranged in such a steep helix with a distinct wall thickness of the deformation section in the region of the base of the flutes, that during the setting operation the counter head takes on the internal form of the distorted, (twisted) expanded deformation section with the wall compacted therein.

Forming the flutes as a steep helix leaving a substantial wall thickness at the base of the flutes gives the surprising effect that the counter head, although being radially expanded particularly extensively, the flutes nevertheless do not split open, so that the counter head retains its closed wall. This is obviously attributable to two effects operating in conjunction with each other, namely, on the one hand, the flute arrangement with a steep helix, by which the forces which spread the wall apart are directed over a greater length along the shank than is the case with axial grooves, whereby the spiral arrangement of the flutes allows the spreading forces acting on the wall to act more in a way of a reciprocal displacement to the opposite wall of the flutes, so that the spreading forces are therefore diverted at least partially. On the other hand, the defined wall thickness left below the base of the flutes ensures that there is sufficient material of the shank available for it to flow into the counter head and ensures an adequate cohesion of the expanded wall of the counter head. The bulge is internally distorted so that the sections of walling left standing at the side of the flutes on account of their spiral arrangement and the compression of the material during the setting operation are pressed still more against one another, which acts against the said spreading forces to modify them, at least partially. The counter head appearing as a twisted bulge within the wall because of its considerable radial expansion, which is substantially greater than the counter head formed on metal blind rivets having non-grooved shanks here forms a particular sturdy abutment to the rivet flange and can thus take up considerably forces, especially in the axial direction.

The flow behavior of the shank during the setting operation can be influenced by giving the flutes variable depth along their longitudinal length. Depending on the depth of the flutes, the twisting in the wall of the counter head is subjected to being more or less packed tightly, which affects the size of the bulge. Suitably, the flutes can be arch-shaped, being deepest in their central area. In this case the outer area of the bulge is given a particular good flowability.

Furthermore, it is possible to design the flutes so that these extend up into the area of the barrel taken up by the structural member. In this case there a twisting of the shank is produced during the setting operation which extends right up into the structural member, so that the ribs lying between the flutes produce a scraping effect against the bore in the structural member which removes any impurities or varnishes in the bore of the structural member. This produces a particularly close bonding between the material of the shank and the material of the structural member, which is especially of advantage in the case of an electrical connection between the blind rivet to the structural member. The ribs lying between the flutes may be wider or smaller than the flutes. Wider ribs result in an increased compactness of the counter head, smaller ribs produce a higher friction of the ribs inside the bore of the structural member, particularly if the ribs are formed with sharp edges. This is again particularly of importance in making electrical contact.

If the quality of an electrical connection is an important requirement in the case of mounting the metal blind rivet in accordance with the invention, then it is enough for the ribs to extend at least up to the structural member, since then the ribs exposed to twisting during the setting operation scrape along the edge formed between the bore and the outer surface of the structural member and thus produce a particular good contact continuance.

BRIEF DESCRIPTION OF THE DRAWINGS

Preferred embodiments of the Invention will now be described in greater detail by way of example only with reference to the accompanying drawings in which.

DETAILED DESCRIPTION OF THE PREFERRED EMBODIMENT

Figure 1:
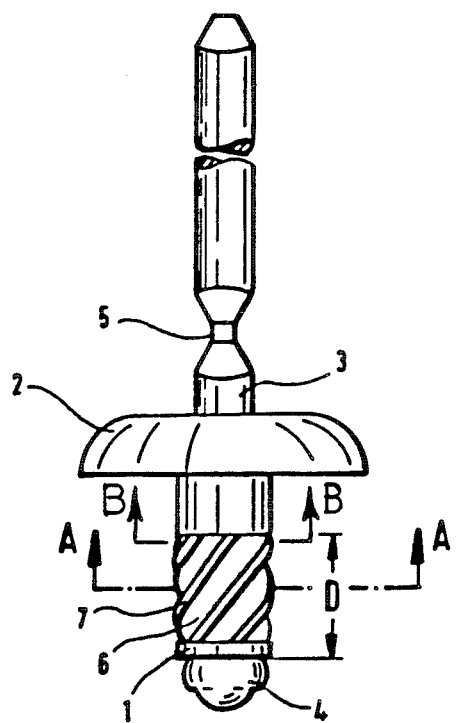
FIG. 1 shows an unset blind rivet of metal having the shank partially fluted.

The metal blind rivet depicted in FIG. 1 consists of rivet sleeve of tubular shank 1, rivet flange 2 and mandrel 3 provided with setting head 4. The mandrel 3 is further provided with break neck 5 lying normally within shank 1 and is thus not visible. All these components are of metal, the material of the mandrel being generally of a higher tensile strength than the material of the rivet sleeve 1.

Examples are known, in which a portion of the mandrel 3 protrudes from the rivet flange 2 in order for example to attach any optional structural element to the corresponding portion of the mandrel 3. In this case, the break neck will be lying outside of the shank 1, which is shown in FIG. 1 and given the reference numeral 5.

Flutes 6 are provided over a substantial length of shank 1 which extend as a steep spiral and still leave a significant wall thickness of the material of the rivet sleeve at their base. Between the flutes 6 lie ribs 7 formed here with sharp edges. The fluted length of the rivet sleeve 1 forms deformation section D of the metal blind rivet, which is transformed during the setting operation to form the counter head. The flutes 6 and the ribs 7 are evenly distributed around the circumference of the rivet flange, so that during the setting operation a radially-symmetrical counter head is produced.

Figure 2:
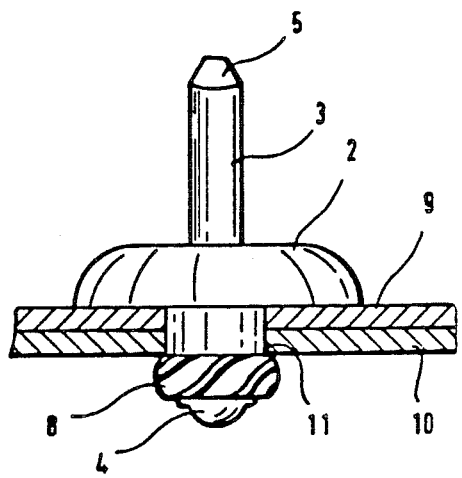
FIG. 2 shows the blind rivet of FIG. 1 after the setting operation.

FIG. 2 shows the blind rivet of FIG. 1 after the setting operation. As can be seen, the setting operation creates a counter head 8 of relatively large diameter, on which the compressed flutes and ribs are depicted as oblique shading, which on account of the setting operation extends substantially less steep than flutes 6 and ribs 7 on the unset blind rivet of FIG. 1. The set blind rivet of FIG. 2 holds two plates 9 and 10 (representing two structural members) together by means of its rivet flange 2 against its counter head 8.

In FIG. 2 is shown additionally a mandrel 3 projecting from the rivet flange as indicated by a dot-dash line in a position it would assume if the break neck 5 of the blind rivet of FIG. 1 had been affixed. In this case a portion of mandrel 3 will remain protruding outwardly after breaking-off at the predetermined breaking point 5.

On the specific embodiment of FIGS. 1 and 2, flutes 6 and ribs 7 extend up to the outer surface of plate 10, so that ribs 7 touching edge 11 of plate 10 scrape along the latter during the setting operation and thus bring about a direct and reliable contact between the metal of counter head 8 and plate 10, to which, if plate 10 is also made of metal, a particularly good electrical contact is thus obtained. The ribs of the deformation section D being subjected to twisting during the setting operation, in fact scrape over edge 11 and the outer surface of plate 10 and thus remove any dirt or, possibly, any applied coat of varnish, so that the setting operation itself brings about the required cleaning of the contact point on plate 10.

Figure 3:
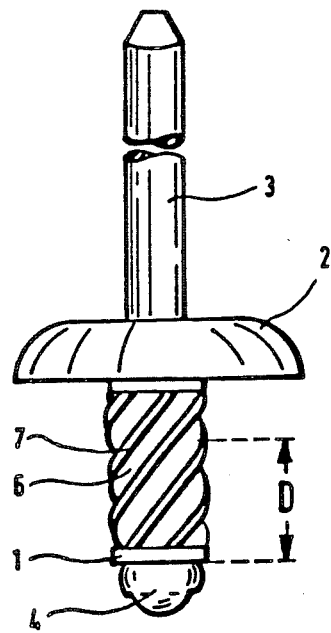
FIG. 3 shows a metal blind rivet having the shank practically completely fluted.
Figure 4:
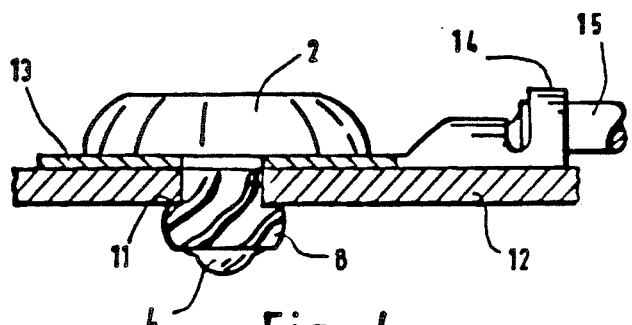
FIG. 4 shows the blind rivet of FIG. 3 after the setting operation, together with an electrical terminal.

The metal blind rivet of FIG. 3 differs merely from the one of FIG. 1 in that the flutes 6 and the ribs 7 extend closely up to the rivet flange, thus beyond the extent of the deformation section D, which before the setting operation projects from the corresponding structural member and is deformed during the setting operation. Consequently, this results, as FIG. 4 shows, in flutes 6 and ribs 7 extending up into the interior of metal plate 12 and electrical terminal 13, which are riveted together by the blind rivet. On account of this extension, rivet sleeve 1 is exposed to twisting in the interior of plate 12 and terminal 13, whereby the ribs scrape on the surface of the bore, penetrating plate 12 and terminal 13 and in addition remove dirt, varnish or suchlike. The same effect is obtained also, only more intensively, on edge 11 and the outer surface of plate 12. A particularly reliable contact is thus obtained between terminal 13 and plate 12 over the rivet sleeve 1. In addition, on account of the relatively large diameter of the counter head 8, also a particularly firm seating of the blind rivet against the structural member, formed by plate 12 and terminal 13 is also obtained. The terminal 13 comprises cable clip 14, into which here cable 15 is soldered.

Figure 5:
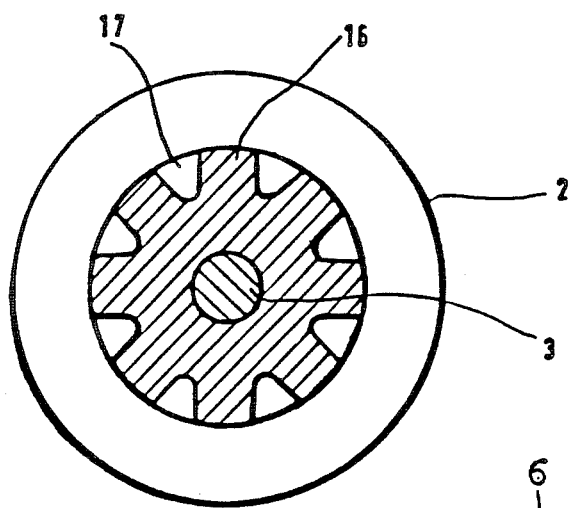
FIG. 5 is a sectional view along the line A—A of FIG. 1, showing a blind rivet having wide ribs between the flutes.
Figure 6:
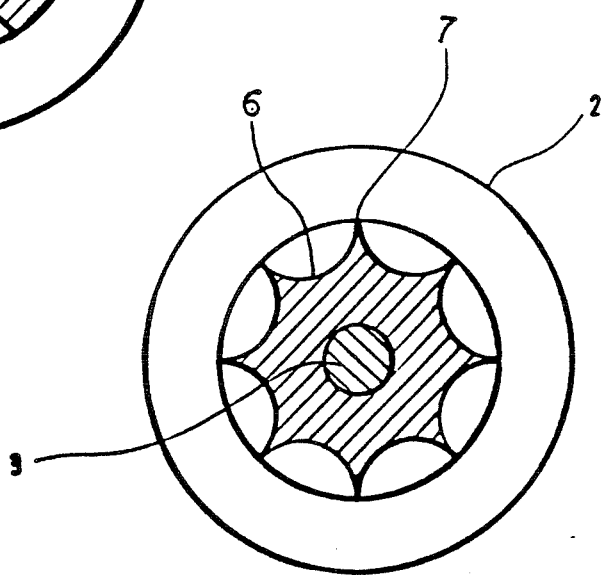
FIG. 6 shows a similar section to FIG. 5 of a modified rivet having narrow, sharp-edged ribs.
Figure 7:
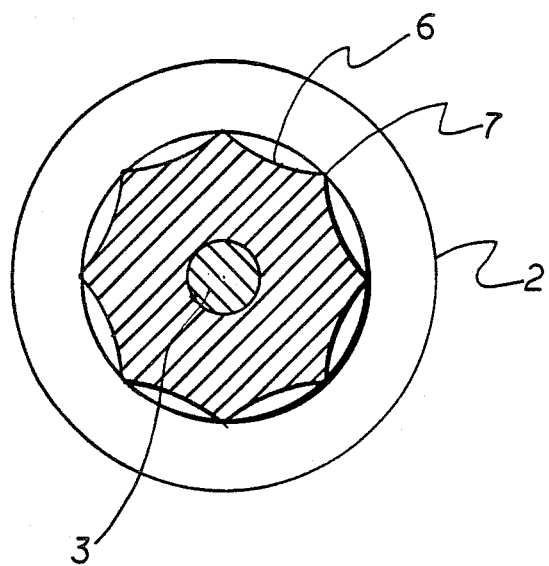
FIG. 7 is a sectional view along line B—B showing the variable depth of the flutes.

In FIGS. 5 and 6 are depicted sectional views of the blind rivet in the area of the deformation section D (along line A—A in FIG. 1), whereby in FIG. 5 it concerns ribs, which are wider than the flutes 17 separating the ribs 16. With this specific embodiment a particular high compactness of the counter head 8 is attained. On the specific embodiment of FIG. 6, ribs 7 are narrower then flutes 6 and formed with sharp edges; with them can thus be achieved in a particular convenient way the aforementioned scraping effect during the setting operation.

As above mentioned, the flutes 6 can be of variable depth along their longitudinal extent, in particular the flutes can be formed to form a curve being deepest in their central area along rivet sleeve 1. Compared with the specific embodiment of FIG. 1, this means that the flutes 6 are deepest approximately in the centre of the deformation section D. According to desired deformation of counter head 8, the depth of flutes 6 may be varied to suit. In each case, however, it must be taken into consideration that there is remaining a distinct wall thickness of rivet sleeve at the base of the flutes 6 such as is clearly shown by the sectional drawings of FIGS. 5 and 6. On these exemplary embodiments the remaining wall thickness lies approximately in the centre of the wall thickness of the non-fluted portion of rivet sleeve 1. It is designed in such a manner that sufficient material of rivet sleeve 1 remains at the bottom of the bases of flutes 17 and 7 so that the rivet sleeve 1 cannot split open during the setting opertion.

From FIGS. 1 and 2 it is evident that ribs 7 extend approximately at an angle of 45° to the longitudinal axis of shank 1. Such a very steep slope of ribs 7 extending spirally is required in order to give the material of shank 1 in the region of the deformation section D the tendency to carry out a twisting motion during the setting operation. If, on the other hand, flutes 6 and ribs 7 were to be provided with more like an ordinary thread, e.g. for screwing on a nut, then this would in practice result in the flutes being merely squeezed together without there being development of any definite twisting effect.

I claim:

1. An assembly including a metal blind rivet and one or more structural members, said rivet comprises:
   a rivet sleeve having a tubular barrel and a flange at one end thereof;
   a mandrel penetrating the rivet sleeve and having a setting head positioned at the end of the rivet sleeve opposite the flange thereof, a breakneck and a stem; and
   a plurality of helical ribs having flutes therebetween distributed evenly about the circumference of said tubular barrel and extending over a substantial length of said barrel, each of said ribs arranged in a helix at an angle of about 45° to the longitudinal axis of said tubular barrel so that during the setting operation, the ribs contact said structural member and carry out a twisting motion to scrape the structural member whereby contaminants such as dirt or varnish are removed to provide electrical contact.

2. Metal blind rivet according to claim 1 wherein the flutes have variable depth along their longitudinal length.

3. Metal blind rivet according to claim 1 wherein the flutes are arch-shaped, being deepest in their central area.

4. Metal blind rivet according to claim 1 wherein the flutes extend up into the area of the barrel taken up by the structural member.

5. Metal blind rivet according to claim 1 wherein the ribs lying between the flutes are wider than said flutes.

6. Metal blind rivet according to claim 1 wherein the ribs lying between the flutes are smaller than the flutes.

7. Metal blind rivet according to claim 1 wherein the ribs are formed with sharp edges.

8. Metal blind rivet according to claim 2 wherein the ribs are formed with sharp edges.

* * * * *